United States Patent
Juzkow

(10) Patent No.: US 11,431,046 B2
(45) Date of Patent: Aug. 30, 2022

(54) LITHIUM-ION CELL USING ALUMINUM CAN

(71) Applicant: NIO Technology (Anhui) Co., Ltd., Heifei (CN)

(72) Inventor: Marc W. Juzkow, Livermore, CA (US)

(73) Assignee: NIO Technology (Anhui) Co., Ltd., Heifei (CN)

( * ) Notice: Subject to any disclaimer, the term of this patent is extended or adjusted under 35 U.S.C. 154(b) by 19 days.

(21) Appl. No.: 16/107,579

(22) Filed: Aug. 21, 2018

(65) Prior Publication Data
US 2020/0067030 A1    Feb. 27, 2020

(51) Int. Cl.
*H01M 4/64*     (2006.01)
*H01M 10/0525*  (2010.01)
(Continued)

(52) U.S. Cl.
CPC .......... *H01M 50/116* (2021.01); *H01M 4/64* (2013.01); *H01M 10/0525* (2013.01);
(Continued)

(58) Field of Classification Search
CPC ........... H01M 10/0525; H01M 10/613; H01M 2/1077; H01M 10/643; H01M 2220/20;
(Continued)

(56) References Cited

U.S. PATENT DOCUMENTS

| | | |
|---|---|---|
| 5,238,757 A | 8/1993 | Suzuki et al. |
| 5,547,782 A | 8/1996 | Dasgupta et al. |
| (Continued) | | |

FOREIGN PATENT DOCUMENTS

| | | | | |
|---|---|---|---|---|
| CN | 101305481 A | * | 11/2008 | ........... B32B 15/017 |
| CN | 103311567 A | * | 9/2013 | ............. Y02E 60/10 |
| (Continued) | | | | |

OTHER PUBLICATIONS

International Search Report and Written Opinion for International (PCT) Patent Application No. PCT/US19/47522, dated Nov. 8, 2019 8 pages.

(Continued)

*Primary Examiner* — Kaity V Chandler

(74) *Attorney, Agent, or Firm* — Sheridan Ross P.C.

(57) ABSTRACT

An energy storage device having improved gravimetric energy density is provided, and methods of manufacturing the same. The device can be an electrochemical cell that includes: a negative electrode including a negative electrode active material in electrically conductive contact with a negative electrode current collector and a negative electrode tab including a first attachment end and a second attachment end, the first attachment end of the negative electrode tab being connected to the negative electrode current collector and the second attachment end of the negative electrode tab being connected to a negative terminal; an electrically insulative and ion conductive medium in ionically conductive contact with the positive electrode and the negative electrode; and an outer can containing the positive electrode, negative electrode and electrically insulative and ion conductive medium, where the negative terminal is electrically isolated from the outer can.

19 Claims, 7 Drawing Sheets

(51) Int. Cl.
*H01M 50/116* (2021.01)
*H01M 50/531* (2021.01)
*H01M 50/543* (2021.01)
*H01M 4/02* (2006.01)

(52) U.S. Cl.
CPC ....... *H01M 50/531* (2021.01); *H01M 50/543* (2021.01); *H01M 2004/027* (2013.01); *H01M 2004/028* (2013.01)

(58) Field of Classification Search
CPC .......... H01M 2/26; H01M 2/30; H01M 4/366; H01M 10/0587; H01M 10/625; H01M 2/022; H01M 10/6567; H01M 2004/021; H01M 2004/027; H01M 2/046; H01M 2/08; H01M 10/0431; H01M 10/052; H01M 10/058; H01M 10/24; H01M 2004/028; H01M 2300/0082; H01M 2/10; H01M 2/12; H01M 2/1653; H01M 4/0404; H01M 4/134; H01M 4/139; H01M 4/38; H01M 4/505; H01M 4/525; H01M 4/62; H01M 4/625; H01M 10/0565; H01M 10/0567; H01M 10/0585; H01M 10/26; H01M 10/28; H01M 10/6557; H01M 10/6568; H01M 2300/0014; H01M 2/0267; H01M 2/0277; H01M 2/04; H01M 2/043; H01M 2/0486; H01M 2/06; H01M 2/145; H01M 2/1673; H01M 2/206; H01M 2/34; H01M 4/0419; H01M 4/0471; H01M 4/131; H01M 4/1391; H01M 4/386; H01M 4/48; H01M 4/483; H01M 4/485; H01M 4/50; H01M 4/622; H01M 4/628; H01M 4/661; H01M 10/04; H01M 10/0413; H01M 10/0422; H01M 10/0436; H01M 10/054; H01M 10/056; H01M 10/0568; H01M 10/0569; H01M 10/425; H01M 10/4257; H01M 10/44; H01M 10/48; H01M 10/647; H01M 10/654; H01M 10/6552; H01M 10/6555; H01M 10/6556; H01M 10/656
See application file for complete search history.

(56) References Cited

U.S. PATENT DOCUMENTS

| | | | | |
|---|---|---|---|---|
| 5,728,482 A * | 3/1998 | Kawakami | ............ | H01M 10/42 429/231.8 |
| 5,919,589 A * | 7/1999 | Kawakami | ............ | H01M 4/587 429/232 |
| 6,325,611 B1 * | 12/2001 | Iwasaki | ............... | H01M 50/531 429/231.95 |
| 7,666,551 B2 | 2/2010 | Kogetsu et al. | | |
| 7,811,710 B2 | 10/2010 | Dahn et al. | | |
| 7,927,732 B2 | 4/2011 | Myerberg et al. | | |
| 8,084,158 B2 | 12/2011 | Chu et al. | | |
| 8,389,154 B2 | 3/2013 | Myerberg et al. | | |
| 8,465,871 B2 | 6/2013 | Juzkow et al. | | |
| 9,425,455 B1 | 8/2016 | Vajo et al. | | |
| 9,698,446 B2 | 7/2017 | Hoshina et al. | | |
| 11,011,806 B2 * | 5/2021 | Fukuoka | ............ | H01M 10/0587 |
| 2001/0049054 A1 * | 12/2001 | Enomoto | ............ | H01M 50/502 429/177 |
| 2002/0015892 A1 | 2/2002 | Kitoh | | |
| 2004/0023107 A1 * | 2/2004 | Nakanishi | ............ | H01M 50/543 429/211 |
| 2004/0062983 A1 | 4/2004 | Abe et al. | | |
| 2006/0238956 A1 | 10/2006 | Casset | | |
| 2008/0026288 A1 * | 1/2008 | Marple | ............ | H01M 50/171 429/178 |
| 2009/0068557 A1 | 3/2009 | Sakashita et al. | | |
| 2009/0081530 A1 * | 3/2009 | Hashimoto | ............ | H01M 50/56 429/185 |
| 2009/0081532 A1 | 3/2009 | Kaplin | | |
| 2009/0148766 A1 * | 6/2009 | Shen | ............ | H01M 50/572 429/164 |
| 2009/0317712 A1 | 12/2009 | Kim et al. | | |
| 2010/0193961 A1 * | 8/2010 | Konishi | ............ | C09J 163/00 257/773 |
| 2011/0123846 A1 * | 5/2011 | Kim | ............ | H01M 50/171 429/94 |
| 2011/0129708 A1 * | 6/2011 | Doo | ............ | H01M 50/169 429/94 |
| 2011/0303736 A1 | 12/2011 | Sigler et al. | | |
| 2012/0121991 A1 * | 5/2012 | Tikhonov | ............ | H01M 4/366 429/199 |
| 2012/0177963 A1 | 7/2012 | Lee et al. | | |
| 2012/0219849 A1 | 8/2012 | Kim | | |
| 2013/0022847 A1 * | 1/2013 | Janousek | ............ | H01M 6/505 429/90 |
| 2013/0288138 A1 * | 10/2013 | Tikhonov | ............ | H01M 4/38 429/188 |
| 2014/0023888 A1 * | 1/2014 | Fulop | ............ | H01M 2/30 429/50 |
| 2015/0295270 A1 | 10/2015 | Chun | | |
| 2015/0336271 A1 | 11/2015 | Spicer et al. | | |
| 2016/0380247 A1 | 12/2016 | Juzkow et al. | | |
| 2017/0149023 A1 | 5/2017 | Baik et al. | | |
| 2017/0214103 A1 * | 7/2017 | Onnerud | ............ | H01G 11/06 |
| 2017/0294635 A1 | 10/2017 | Kim et al. | | |
| 2017/0309880 A1 | 10/2017 | Ko et al. | | |
| 2018/0034011 A1 * | 2/2018 | Tsuda | ............ | H01M 10/0568 |
| 2018/0130994 A1 * | 5/2018 | Yamaguchi | ............ | H01M 50/531 |
| 2018/0241026 A1 * | 8/2018 | Shibutani | ............ | H01M 10/05 |
| 2018/0323475 A1 * | 11/2018 | Pasma | ............ | H01M 2/0277 |
| 2019/0198882 A1 | 6/2019 | Jeong | | |

FOREIGN PATENT DOCUMENTS

| | | | | |
|---|---|---|---|---|
| CN | 103733388 A | * | 4/2014 | ............ H01M 4/75 |
| CN | 203536530 U | * | 4/2014 | ............ Y02E 60/10 |
| EP | 962995 A2 | * | 12/1999 | ............ B60K 6/28 |
| JP | 2002-216709 | | 8/2002 | |
| JP | 2007-234305 | | 9/2007 | |
| JP | 2009-230991 | | 10/2009 | |
| JP | 2013-093119 | | 5/2013 | |
| JP | 2016-066583 | | 4/2016 | |
| KR | 2009-0082125 | | 7/2009 | |
| KR | 10-2015-0133030 | | 11/2015 | |
| WO | WO-2011080989 A1 | * | 7/2011 | ............ H01G 11/82 |

OTHER PUBLICATIONS

U.S. Appl. No. 15/692,723, filed Aug. 31, 2017, Newman et al.
Goodenough, "Lithium Ion Batteries, Chapter 1, General Concepts," Wiley-VCH press, Edited by M. Wasihara and O. Yamamoto, 1998, 27 pages.
U.S. Appl. No. 16/459,355, filed Jul. 1, 2019, Juzkow et al.
Official Action for U.S. Appl. No. 15/692,723, dated Sep. 12, 2019 8 pages.
Official Action for U.S. Appl. No. 15/692,723, dated Jun. 20, 2019 9 pages, Restriction Requirement.
Official Action for U.S. Appl. No. 15/692,723, dated Jul. 24, 2020 14 pages.
Final Action for U.S. Appl. No. 15/692,723, dated Feb. 26, 2020 10 pages.
Final Action for U.S. Appl. No. 16/459,355, dated May 18, 2021 26 pages.
International Preliminary Report on Patentability for International (PCT) Patent Application No. PCT/US19/47522, dated Mar. 4, 2021 7 pages.
Official Action for U.S. Appl. No. 16/459,355, dated Feb. 9, 2021 21 pages.

* cited by examiner

LITHIUM-ION CELL USING ALUMINUM CAN

FIELD

The present disclosure is generally directed to electrochemical cells having improved gravimetric energy density and batteries including electrochemical cells having improved gravimetric energy density.

BACKGROUND

In recent years, the demand for high performance batteries has increased, driven in part by the increasingly large number of portable consumer electronics products and growing needs of batteries hybrid and fully electric vehicles. Lithium-ion cells are found in many applications requiring high energy and high power densities, as they can provide high volumetric and gravimetric efficiency in single and multi-cell battery packs. Such battery packs can be used in many applications, for example in portable electronic devices and in hybrid and fully electric vehicles.

Increasing the gravimetric energy density of a lithium-ion cell by increasing the energy of the cell in comparison to the weight of the cell is advantageous in order to improve the performance of the cell. Increases in gravimetric energy density have conventionally been difficult to achieve. Reasons for this include the fact that it can be difficult to decrease the weight of lithium-ion cells.

Therefore, there is a need to develop designs and methods for improving the gravimetric energy density of electrochemical cells. The present disclosure satisfies these and other needs.

DETAILED DESCRIPTION

Figure 1:
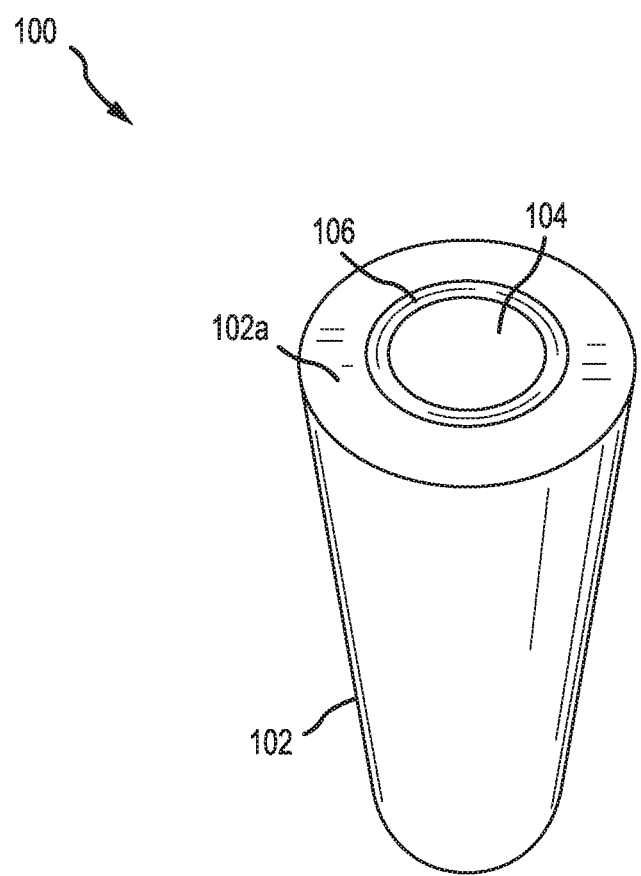
FIG. 1 shows a perspective view of the bottom and a side of a cell in accordance with embodiments of the present disclosure.

Embodiments of the present disclosure will be described in connection with electrochemical cells, and in some embodiments, the construction, structure, and arrangement of components making up electrochemical cells and the methods of manufacturing electrochemical cells. In some embodiments, the lithium-ion cells as disclosed herein can have negative electrodes including negative electrode active materials such as hard carbon, graphite, silicon compounds, or a combination thereof, and positive electrodes including positive electrode active materials whose charge storage and discharge mechanisms involve the de-insertion and insertion of Li ions, respectively. In some embodiments, this is accomplished by intercalation and de-intercalation in and out of a layered, olivine or spinel structure.

The term "positive electrode" refers to one of a pair of rechargeable lithium-ion cell electrodes that under normal circumstances and when the cell is fully charged will have the higher potential versus a lithium reference electrode. This terminology is retained to refer to the same physical electrode under all cell operating conditions even if such electrode temporarily (e.g., due to cell overdischarge) is driven to or exhibits a potential below that of the other (the negative) electrode.

The term "negative electrode" refers to one of a pair of rechargeable lithium-ion cell electrodes that, under normal circumstances and when the cell is fully charged, will have the lower potential versus a lithium reference electrode. This terminology is retained to refer to the same physical electrode under all cell operating conditions even if such electrode is temporarily (e.g., due to cell overdischarge) driven to or exhibits a potential above that of the other (the positive) electrode.

In electrochemical cells, it is generally advantageous to increase the gravimetric energy density of the cell as this value directly translates to the gravimetric energy density of lithium-ion battery modules and battery packs. Lithium-ion electrochemical cells are made up of various components that include a positive electrode and at least one positive tab, a negative electrode and at least one negative tab, an electrolyte, separator film, and a can, within which the components are inserted and a top header is used to seal the cell. In conventional lithium-ion cells nickel-plated mild steel is used for the can but it is heavier than other possible can material options. Decreasing the weight of the can directly translates into higher gravimetric energy density of the cell.

In cylindrical cells, the standard design has the negative electrode tab resistance welded to the bottom of the inside of the can, which results in a negative can potential. The negative tab is typically nickel, copper or a combination of nickel and copper. Welding this negative tab to the nickel plated mild steel can be accomplished consistently with a resistance spot welder.

In standard lithium-ion cells the metal cans are held at the negative electrode potential versus Li/Li+. It is thus important to choose materials that are stable and will not corrode, react or alloy at the negative electrode potential. Nickel-plated mild steel is stable and does not corrode, react or alloy at the negative potential of the electrochemical cell. One choice for a lighter weight can is aluminum, as aluminum is less dense than mild steel. Aluminum, however, is only stable at the potential of the positive electrode and can alloy with lithium when at a lower potential, typically below 0.3V vs. the Li/Li+ potential. These are some of the electrochemical reasons why aluminum cans are not used in the standard lithium-ion cylindrical cell design. Embodiments in the present disclosure advantageously increase the gravimetric energy density of lithium-ion cells by providing cells that can use a can material that is lighter-weight than nickel-plated mild steel while avoiding corrosion issues. Increases of more than about 5 percent in the gravimetric energy density of cylindrical lithium-ion cells (e.g., 18650 cell (18 mm diameter×70 mm length) and 21700 cell (21 mm diameter×70 mm length) lithium-ion cells) can be achieved when using aluminum as the can material instead of nickel-plated mild steel, and more than about 3 percent in the gravimetric density when using titanium as the can material instead of nickel-plated steel.

Various embodiments provide such advantages by using a negative electrode tab to connect to a negative terminal of the cell while having the negative electrode tab and the negative terminal being electrically isolated from the outer (neutral) can and the positive electrode of the cell and the positive electrode tab and the positive terminal being electrically isolated from the outer (neutral) can, as described herein. Other various embodiments provide such advantages by using a negative electrode tab to connect to a negative terminal of the cell while having the negative electrode tab being electrically isolated from the positive electrode of the cell. In various embodiments, the can of the lithium-ion cell is isolated so that it is a floating voltage and the negative terminal is isolated from the can and the positive electrode. In various embodiments, the negative terminal is nickel and the nickel terminal is isolated from an aluminum can to reduce or prevent corrosion of the nickel because nickel at the negative potential does not corrode. In various embodiments, the negative terminal is titanium and the nickel terminal is isolated from an aluminum can to reduce or prevent corrosion of the titanium because titanium at the negative potential does not corrode.

Various embodiments relate to an electrochemical cell having an electrode composition formed into a sheet or film, and contacted with current collectors to form a laminated structure. The electrochemical cell can include a positive electrode, a negative electrode, and an ion conductive medium in ionically conductive contact with the positive electrode and the negative electrode. The cell includes a negative electrode tab including a first attachment end and a second attachment end, where the first attachment end is connected to the negative electrode. The negative electrode includes a negative electrode active material and a negative electrode current collector. The negative electrode current collector is in contact with the negative electrode active material. The first attachment end of the negative electrode tab can be in contact with the negative electrode current collector. The second attachment end of the negative electrode tab is in contact the negative external terminal of the electrochemical cell.

The electrochemical cell may include a positive electrode tab including a first attachment end and a second attachment end, where the first attachment end can be connected to a positive electrode. The positive electrode includes a positive electrode active material and a positive electrode current collector, where the positive electrode current collector is in contact with the positive electrode active material. The first attachment end of the positive electrode tab can connect to the positive electrode current collector. The second attachment end of the positive electrode tab can connect to the positive terminal of the electrochemical cell.

At least a portion of the negative electrode tab may be in contact with an electrically insulative tape. For example, the electrically insulative tape may extend along portions of sides of the negative electrode tab where the negative electrode tab would otherwise be in contact with the positive electrode or the cell can. The electrically insulative tape may extend along the negative electrode tab at additional portions of the negative electrode tab other than only where the negative electrode tab would otherwise be in contact with the positive electrode and the can of the cell. In some embodiments, the electrically insulative tape may extend along sides of the negative electrode tab from the negative electrode current collector to about a few millimeters from where the negative electrode tab contacts the external negative terminal.

In further embodiments, at least a portion of the negative electrode tab may be in contact with a coating. To prevent the negative terminal from contacting the positive electrodes or the can, epoxy can be used to coat the tab with the exception of the end, typically about 1 mm to about 5 mm, that is attached to the negative terminal. The epoxy must be resilient to the electrolyte inside the cell. For example, the coating may extend along portions of sides of the negative electrode tab where the negative electrode tab would otherwise be in contact with the positive electrode or the cell can. The coating may extend along the negative electrode tab at additional portions of the negative electrode tab other than only where the negative electrode tab would otherwise be in contact with the positive electrode and the can of the cell. In some embodiments, the coating may extend along sides of the negative electrode tab from the negative electrode current collector to about a few millimeters from where the negative electrode tab contacts the external negative terminal.

In embodiments, the electrochemical cell is enclosed within the can where the can has openings at each of the positive electrode and the negative electrode. In various embodiments, the electrodes may be referred to herein as terminals. The can is advantageously made of a material that is less dense than nickel-plated mild steel. The can may be made from aluminum or titanium, for example. The can may be wrapped in an electrically insulating material, such as a deformable or pliable film or layer with a polymeric shrink wrap material being an example, that substantially covers the entirety of an external surface area of the can (except for the terminals) and the electrically insulating material may extend to be in contact with gaskets separating the positive and negative terminals from the outer can. The gaskets can electrically insulate the positive and negative terminals from the can.

Embodiments can provide an electrochemical cell, including: a positive electrode including a positive electrode active material in electrically conductive contact with a positive electrode current collector; a negative electrode including a negative electrode active material in electrically conductive contact with a negative electrode current collector; an electrically insulative and ion conductive medium in ionically conductive contact with the positive electrode and the negative electrode, wherein the ionically conductive medium comprises an electrically insulating porous layer and an electrolyte; and a negative electrode tab including a first attachment end and a second attachment end, where the first attachment end of the negative electrode tab is connected to the negative electrode current collector, where the second attachment end of the negative electrode tab is connected to a negative terminal, and where an electrically insulative tape is in contact with at least a portion of the negative electrode tab.

Embodiments can provide a method of manufacturing an electrochemical cell, including: providing a positive electrode including a positive electrode active material in electrically conductive contact with a positive electrode current collector; providing a negative electrode including a negative electrode active material in electrically conductive contact with a negative electrode current collector; providing an electrically insulative and ion conductive medium in ionically conductive contact with the positive electrode and the negative electrode, where the ionically conductive medium comprises an electrically insulating porous layer and an electrolyte; and providing a negative electrode tab including a first attachment end and a second attachment end, where the first attachment end of the negative electrode tab is connected to the negative electrode current collector, where the second attachment end of the negative electrode tab is connected to a negative terminal, and where an electrically insulative tape is in contact with a portion of the negative electrode tab.

Referring to FIG. 1, a perspective view of the bottom and a side of a cell 100 is shown in accordance with embodiments of the present disclosure. The cell 100 may include a can 102 that extends to the bottom side of the cell 102a. For example, the can 102 may surround sides of the cell and a portion of the bottom side of the cell, and the can 102 at the bottom of the cell may be referred to by reference number 102a herein. The cell 100 has a negative terminal 104 that is separated from the can on the bottom side of the cell 102a by a gasket 106. The gasket 106 can electrically insulate the can 102 from the negative terminal 104. A similar gasket can separate the positive terminal (not shown) from the can on the upper side of the cell to electrically insulate the can 201 from the positive terminal.

The negative terminal 104 can be flush with the can on the bottom side of the cell 102a, extend beyond the can on the bottom side of the cell 102a, or be inset within the can on the bottom side of the cell 102a. The negative terminal 104 can be constructed of nickel (Ni), Ni plated mild steel, titanium (Ti), a nickel or titanium alloy, or any other electrically conductive metal that is stable at the low potentials (e.g., from 0V to 2V versus Li/Li+).

As discussed above, conventional lithium-ion cells use nickel-plated mild steel metal cans, where the can is at the negative potential versus Li/Li+. Advantageously, the can 102 used for lithium-ion cells of the present disclosure can use lighter materials to replace the nickel-plated mild steel can conventionally be used. The lighter materials of the can 102 includes materials that are lighter-weight than nickel-plated mild steel, including but not limited to aluminum and titanium and alloys thereof. In various embodiments, the can 102 is made of titanium or a titanium alloy, which does not corrode at the negative potential versus Li/Li+ and thus would enable the cell to avoid use of the gasket 106, thereby making the gasket optional. Thus, if the can 102 of the cell were made of titanium or a titanium alloy, the negative terminal 104 can be in contact with the can 102. As will be appreciated, an "alloy" refers to a metal composition made by combining two or more metals, such as aluminum or titanium with one or more of copper, magnesium, manganese, silicon, tin, and zinc, or by combining a metal with another material, such as carbon. Aluminum alloys are alloys in which aluminum is the predominant metal while titanium alloys are alloys in which titanium is the predominant metal.

The gasket 106 can be any material that is electrically insulative. For example, the gasket 106 at the negative terminal 104 can be the same or similar to any material used conventionally in gaskets of the headers of cells. The gasket 106 can be made of materials including but not limited to glass, polymer, resin, and ceramics, and combinations thereof. For example, the gasket 106 material can include but is not limited to: polypropylene (PP), polyphenylene sulfide (PPS) resin, polyether ether ketone (PEEK) resin, polychlorotrifluoroethylene (PCTFE), polybutylene terephthalate (PBT) or other polymer materials.

Figure 2:
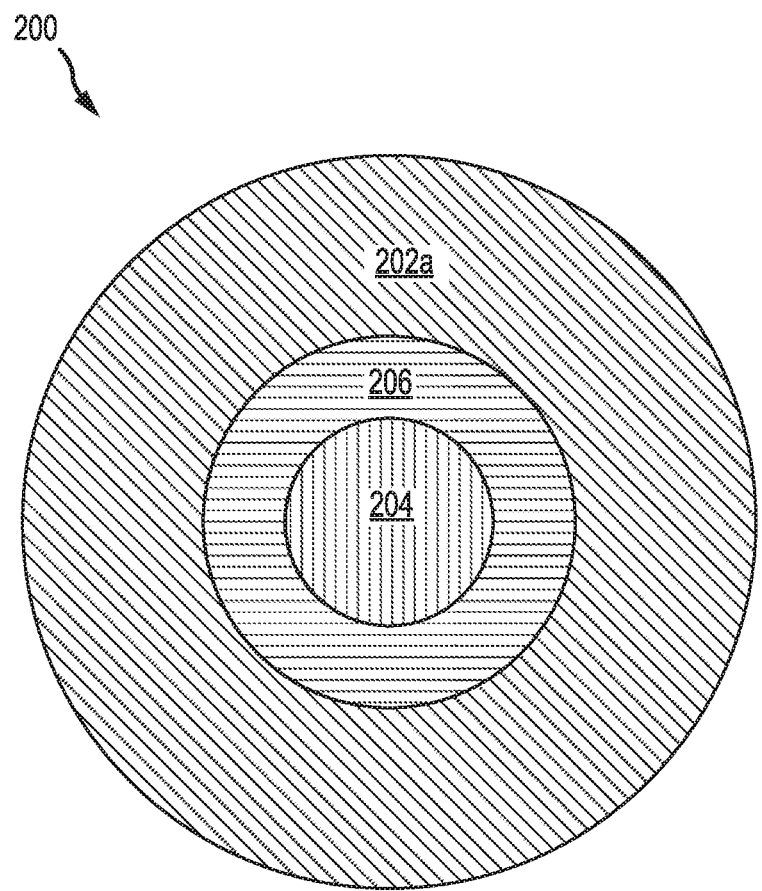
FIG. 2 shows a orthogonal view of the bottom of a cell in accordance with embodiments of the present disclosure.

FIG. 2 shows a perspective orthogonal view of the bottom of a cell 200 in accordance with embodiments of the present disclosure. The can on the bottom of the cell 202a is separated from the negative terminal 204 by a gasket 206. In embodiments, the can may be surrounded by a shrink wrap or other electrically insulating material as shown, for example, in FIG. 3.

Figure 3:
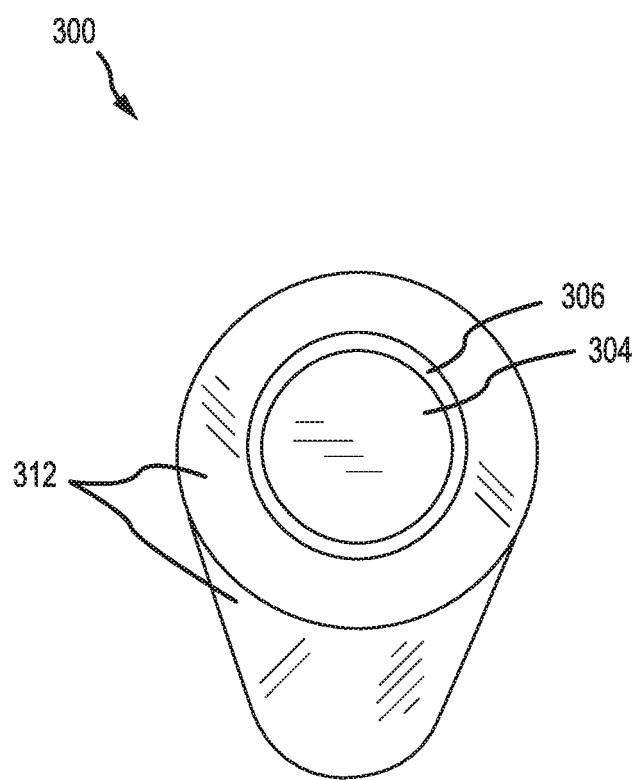
FIG. 3 shows a perspective view of shrink wrap on the bottom of a cell in accordance with embodiments of the present disclosure.

FIG. 3 shows a perspective view of shrink wrap on the side and bottom of a cell 300 in accordance with embodiments of the present disclosure. In FIG. 3, a shrink wrap 312 covers the cell such that it is in contact with all exterior surfaces of the can, including extending to be in contact with the gasket 306. The negative terminal 304 is exposed as is the positive terminal (not shown).

Advantageously, the shrink wrap 312 can prevent an inadvertent electrical connection between the can and either of the positive terminal or the negative terminal. Unlike a standard cell, there would not be a short circuit even if this were to occur if the can is neutral. The shrink wrap can be made of any electrically insulative material, including but not limited to polyvinyl chloride (PVC), polyethylene (PE), polypropylene (PP), other polymeric materials, organic polymers, and combinations thereof.

Figure 4:
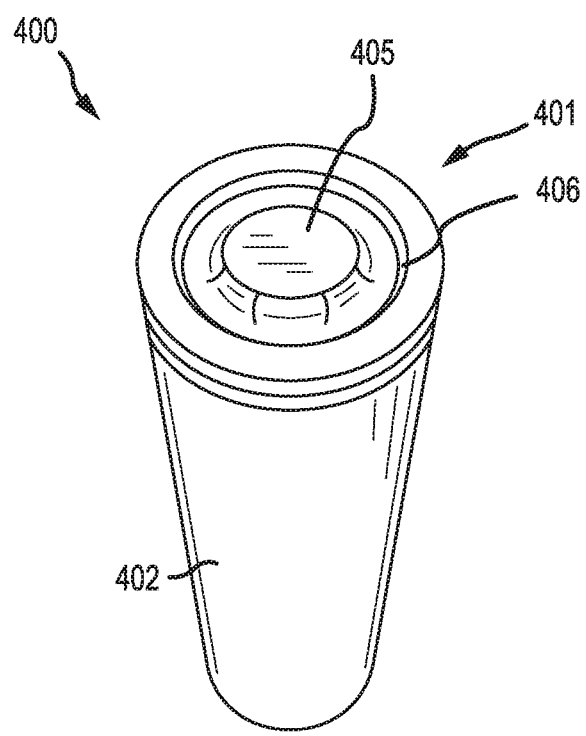
FIG. 4 shows a perspective view of the top and a side of a cell in accordance with embodiments of the present disclosure.

FIG. 4 shows a perspective view of the top and a side of a cell 400 in accordance with embodiments of the present disclosure. FIG. 4 shows a top side of the cell 401, a side of the cell that is the can on the side 402, and a positive terminal 405, separated by a gasket 406.

In embodiments of the present disclosure, the cell 401 can use a conventional header. Conventional lithium-ion cells can utilize a mechanical safety device and a positive thermal coefficient (PTC) device. A device called a Current Interrupt Device (CID) can be used. The CID device may have functions that include overcharge protection, overvoltage protection and protection against other abusive conditions that lead to increased internal pressure. Increased internal pressure can cause a disc (sometimes referred to as a vent or burst disc) to move and separate from another disc (sometimes referred to as a weld disc). Also, indirectly high temperature can lead to electrolyte decomposition, gas generation and increased internal cell pressure. The movement of the vent disc can break a weld and disconnect the positive header of the cell from the positive electrode, thereby permanently interrupting the flow of current in or out of the cell. The PTC device, only used in cells that operate at low rates, can protect against over current and can also activate when a high temperature is reached. In an over current situation, increased current through the PTC device increases the device temperature and causes the PTC device resistance to increase several orders of magnitude. Thus, temperature can be used to activate the PTC device when a high temperature is reached. This high temperature can result from either an over current through the resistive PTC device or high internal or external temperatures. The PTC device does not totally eliminate the current into or out of the cell but the current is significantly decreased.

Advantageously, because standard lithium-ion cell headers can be used, cells as disclosed herein may not require adjustments to manufacturing processes for making headers of cells for the present embodiments. In addition, the lithium-ion cells disclosed herein may use any type of positive and negative terminal design, with varying components, including but not limited to the use of PTC devices, thin metal tabs, and CID devices in the headers of the cells, and any methods and materials may be used for components of the cells, including but not limited to any type of tape, any type of welding materials, and any methods of taping and welding.

The interior of the cells in the present disclosure may include a positive electrode, a negative electrode, separators, and an electrolyte. The positive electrode can include a positive electrode active material and a positive electrode current collector having a conductive coating. The negative electrode can include a negative electrode active material and a negative electrode current collector having a conductive coating. The electrolyte may be present within the positive electrode, the negative electrode, and the separators, and may include a lithium compound such that the electrolyte, the positive electrode, and the negative electrode are in ionically conductive contact with each other. The bottom end of the cell includes a negative electrode tab in contact with the negative terminal.

The interior of the cell can have the positive electrode, the negative electrode, and one or more of the separators wound into a "jelly roll" form that is enclosed within the can. The "jelly roll" of electrodes and separators can have an outer wrap of separator and/or insulating tape. Also, the internal tabs are electrically insulated by an electrically insulative material that extends from the edge of the corresponding current collector to the end of the respective tab. The positive and negative electrode tabs do not have to have a same or similar configuration, or they may have the same configuration with respect to the electrically insulative material. In various embodiments, the electrically insulative material may be a coating or tape. The electrically insulative material may be located alongside the tab or adjacent to the tab, and may be adhered to the tab. The electrically insulative material may be located at various portions of the tab or throughout an entirety of an exposed portion of the tab (where the exposed portion is the surface area of the tab that extends from the corresponding current collector to the end of the tab; thus, the exposed portion is where the tab would be in contact with the oppositely-charged electrode or the can if not for the presence of the electrically insulative material). The end or ends of the tab can refer to areas of the tab where the tab is in electrical contact with other components. Thus, for example, the end of the tab may refer to a surface area of the tab where the end opposite from the corresponding current collector is in contact with another component (e.g., for the negative electrode tab, the end is in contact with the negative terminal). In various embodiments, the tabs are taped from the edge of the corresponding current collector to a few mm (e.g., typically from about 1 mm to about 5 mm) from the end of the respective tab. The tape may be on various surfaces of the tab (e.g., a side of the oppositely-charged electrode and a side of the can), and may partially or fully surround (e.g., enclose in a circumferential direction) the tab. As noted, the electrically insulative material (e.g., the coating and/or tape) prevents (in the can of the negative electrode tab) the internal tab from contacting the positive electrode or cell can, and (in the case of the positive electrode tab) the positive internal tab from contacting the negative electrode or the cell can.

In various embodiments disclosed herein, the components of the cells and the function of the cells may correspond to conventional components and functions as they relate to the jelly roll and header of the cells. The advantageous effects of this disclosure can result from the differences in materials and properties of the can, for example, and the design of the negative terminal, gasket, and tab, as discussed herein.

In some embodiments, the present disclosure provides a positive electrode that includes positive electrode active materials and a positive current collector (not shown). The positive electrode can have an upper charging voltage of about 3.1 volts versus a Li/Li$^+$ reference electrode. In embodiments, the upper charging voltage is the maximum voltage to which the positive electrode may be charged at a low rate of charge and with significant reversible storage capacity. In some embodiments, cells utilizing a positive electrode with upper charging voltages from about 3 to about 5.3 volts versus a Li/Li$^+$ reference electrode can be used. A variety of positive electrode active materials can be used. Non-limiting exemplary positive electrode active materials include transition metal oxides, phosphates and sulfates, and lithiated transition metal oxides, phosphates and sulfates.

Figure 5:
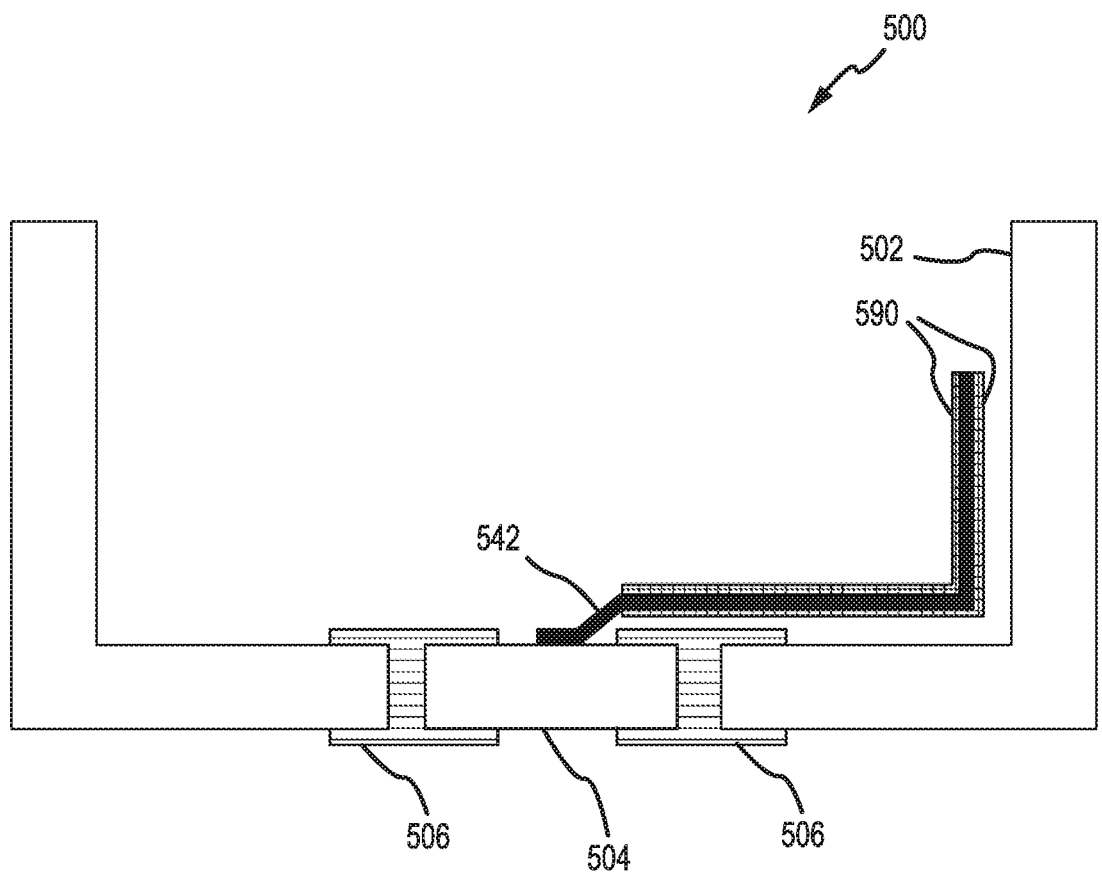
FIG. 5 shows a detailed cross-sectional view of the bottom of a cell in accordance with embodiments of the present disclosure.

FIG. 5 shows a detailed cross-sectional view of the bottom of a cell 500 in accordance with embodiments of the present disclosure. FIG. 5 shows a negative electrode tab 542 welded to a negative terminal 504 and a gasket 506 between the can 502 and the negative terminal 504.

FIG. 5 shows embodiments of an electrically insulative tape 590 in contact with the negative electrode tab 542. In embodiments, the negative electrode tab 542 is electrically connected to the negative terminal 504 while being electrically isolated from the can 502 and the positive electrode (not shown).

For example, the electrically insulative tape 590 can be present from a point where the negative electrode tab 542 contacts the negative electrode current collector (not shown) to within an area prior to where the end of the negative electrode tab 542 connects to the negative terminal 504. The electrically insulative tape 590 can be in contact with a front and a back surface of a portion of (or portions of) the negative electrode tab 542, or the electrically insulative tape 590 can enclose portions of the negative electrode tab 542. In some embodiments, the electrically insulative tape 590 can be positioned in any portion of the negative electrode tab such that the electrically insulative tape 590 prevents an electrical connection of the negative electrode tab with the positive electrode. In some embodiments, the electrically insulative tape 590 can be positioned in any portion of the negative electrode tab such that the electrically insulative tape 590 prevents an electrical connection of the negative electrode tab with the positive electrode and the can 502. In embodiments, a portion of the negative electrode tab 542 is not in contact with the electrically insulative tape 590 where the negative electrode tab 542 is electrically connected to the negative terminal 504 (e.g., by resistance welding). A distance from the negative terminal 504 to the electrically insulate tape 590 on the negative electrode tab 542 is typically from about 0.1 millimeter to about 10 millimeters, more typically from about 1 millimeter to about 5 millimeters, more typically from about 1 millimeter to about 3 millimeters, and more typically from about 1 millimeter to about 2 millimeters. The electrically insulative tape 590 can be any tape used in relation to conventional positive electrodes of lithium-ion cells; for example, the electrically insulative tape 590 can be a polyimide material (e.g., Kapton®), among others.

As described herein, processes used for the negative electrode tab may be the same or similar to the processes used for the positive electrode tab. Thus, the process to tape the negative electrode tab 542 can be similar to a process that is already performed for the positive tab of the cell 500. Advantages of using a same or similar process and/or materials include the reuse of same manufacturing processes and/or equipment.

Figure 6:
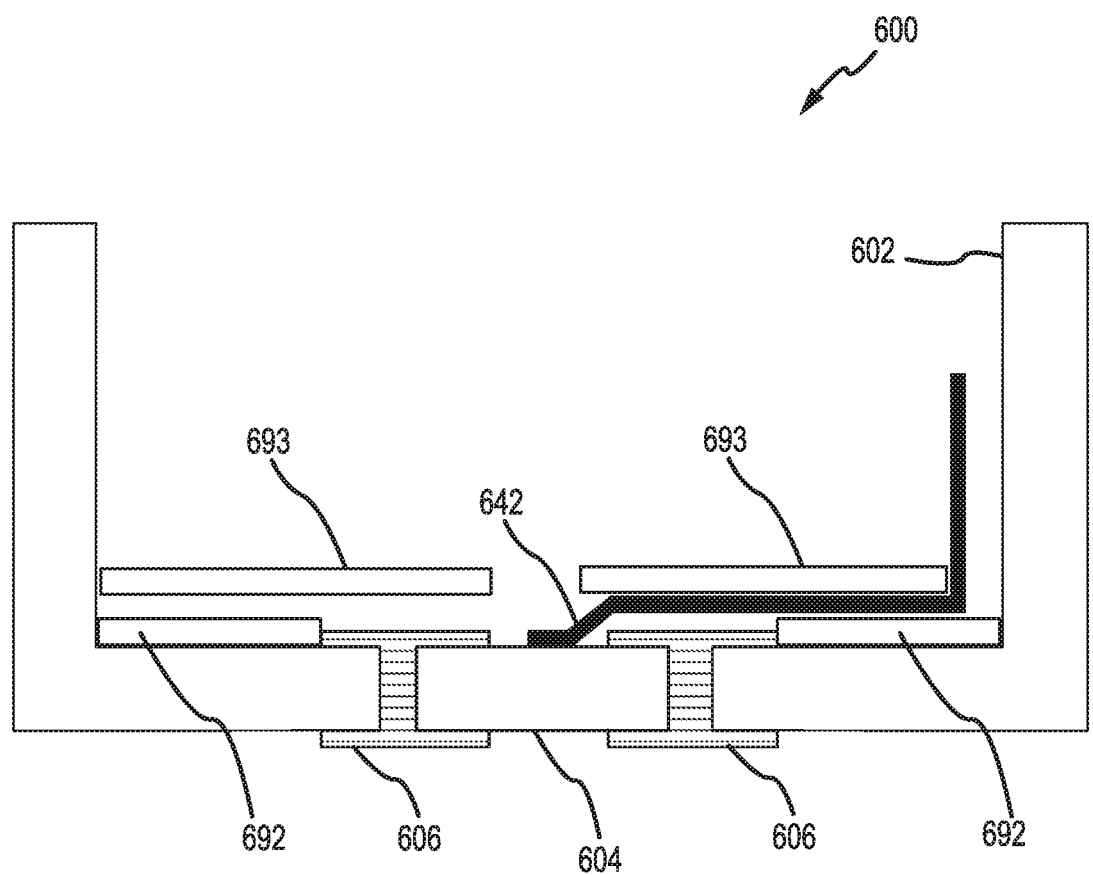
FIG. 6 shows a detailed cross-sectional view of the bottom of a cell in accordance with embodiments of the present disclosure.

FIG. 6 shows a detailed cross-sectional view of the bottom of a cell 600 in accordance with embodiments of the present disclosure. FIG. 6 shows a negative electrode tab 642 welded to a negative terminal 604, a gasket 606 between the can 602 and the negative terminal 604, an insulator 692, and an insulative disc 693. An illustrative embodiment of the insulator 692 is shown by way of example in FIG. 7.

The insulative disc 693 can be present in an area that corresponds to the bottom surface area of the can. For example, the insulative disc 693 may have a shape that corresponds to a circumferential shape of the can. In some embodiments, the insulative disc 693 may have a cylindrical shape (e.g., a cylindrical shape with an outer circumference that corresponds to an internal circumference of the can, an internal circumference that corresponds to a desired area in the center of the can, such as an area corresponding to a negative terminal and/or a location of a negative tab) and a height that is about 0.1 mm to about 1 mm thick. The insulative disc 693 may be a circular shape with a circular hole in the middle that is similar to a donut, or ring, shape, and may be symmetrical or asymmetrical. The insulative disc 693 may be in contact with side walls of the can 602 or there may be some amount of space between the side walls of the can 602 and the insulative disc 693. In various embodiments, the insulative disc 693 may be an integral piece. In certain embodiments, the insulative disc 693 may replace tape as an electrical insulator for the negative electrode tab 642 between the negative electrode tab 642 and a positive electrode (not shown). The insulative disc 693 can be in contact with a front surface (e.g., a surface facing the top surface of the can (not shown)) of a portion of (or portions of) the negative electrode tab 642. The insulative disc 693 may have any thickness and may be about 0.1 mm to about 1 mm thick. It can be made of any electrically insulative material, including but not limited to polyvinyl chloride (PVC), polyethylene (PE), polypropylene (PP), other polymeric materials, organic polymers, and combinations thereof.

In various embodiments, the insulator 692 may be the same as, or similar to the insulative disc 693. For example, the insulator 692 may be the same or different electrically insulating material as an insulative disc 693. The insulator 692 may be adjacent to and in contact with an interior bottom surface of the can 602, and the insulator 692 can be present in an area that corresponds to the bottom surface area of the can with a hole in the center. The insulator 692 may have a shape that corresponds to a circumferential shape of the can. In some embodiments, the insulator 692 may have a cylindrical shape (e.g., a cylindrical shape with an outer circumference that corresponds to an internal circumference of the can, an internal circumference that corresponds to a desired area in the center of the can, such as an area corresponding to a negative terminal and/or a location of a negative tab) and a height that is about 0.1 mm to about 1 mm thick. In some aspects, the insulator 692 may have a circular shape with a circular hole in the middle that is similar to a donut, or ring, shape, and may be symmetrical or asymmetrical. The insulator 692 may extend from side walls of the can 602 to a position adjacent to the gasket 606. The insulator 692 may be in contact with the side walls of the can 602 and the gasket 606, or there may be some amount of space between one or more of the side walls of the can 602 and the gasket 606. Alternatively, the insulator 692 may extend to cover a portion or all of the gasket 606. The insulator 692 may be an integral piece. In certain embodiments, the insulator 692 may replace tape as an electrical insulator for the negative electrode tab 642 between the negative electrode tab 642 and the can 602.

The insulator 692 may be a coating, such as an epoxy coating. The epoxy must be resilient to the electrolyte inside the cell. To prevent one or more of the negative electrode tab 642 and the negative terminal 604 from contacting the can 602, the epoxy can be used to coat at least a portion of the interior bottom surface of the can 602 with the exception of an area that correspond to the end of the negative electrode tab 642, which may typically be about 1 mm to about 5 mm, from where the negative electrode tab 642 is attached to the negative terminal 604. For example, the coating may extend along an entirety, or a portion of, an interior bottom surface of the can 602 where the negative electrode tab would otherwise be in contact with the cell can (except for an area where the negative electrode tab contacts the can at the negative terminal 604. The insulator 602 may extend from side walls of the can 602 to a position adjacent to the gasket 606. The insulator 692 may be in contact with the side walls of the can 602 and the gasket 606, or there may be some amount of space between one or more of the side walls of the can 602 and the gasket 606. Alternatively, the insulator 692 may extend to cover a portion or all of the gasket 606. The coating may extend along the interior bottom surface of the can 602 in any manner. In some embodiments, the coating may extend to within about a few millimeters from where the negative electrode tab 642 contacts the external negative terminal 604.

The insulator 692 can be present from a point where the negative electrode tab 642 contacts the negative electrode current collector (not shown) to within an area adjacent to, or prior to, where the end of the negative electrode tab 642 connects to the negative terminal 604. The insulator 692 can be in contact with a back surface (e.g., a surface facing the bottom surface of the can 602) of a portion of (or portions of) the negative electrode tab 642. In some embodiments, the insulator 692 can be positioned along any portion of the negative electrode tab 642 such that the insulator 692 prevents an electrical connection of the negative electrode tab 642 with the can 602, except for an area where the negative electrode tab 642 contacts an interior area of the can corresponding to the negative terminal 604. In embodiments, a portion of the negative electrode tab 642 is not in contact with the insulator 692 where the negative electrode tab 642 is electrically connected to the negative terminal 604 (e.g., by resistance welding). A distance from the negative terminal 604 to the insulator 692 on the negative electrode tab 642 may typically be from about 0.1 millimeter to about 5 millimeters, more typically from about 1 millimeter to about 3 millimeters, and more typically from about 1 millimeter to about 2 millimeters. The insulator 692 may have any thickness and may be about 0.1 mm to about 1 mm thick. The insulator 692 can be made of any electrically insulative material, including but not limited to polyvinyl chloride (PVC), polyethylene (PE), polypropylene (PP), other polymeric materials, organic polymers, and combinations thereof.

In some aspects, the insulative disc 693 may be placed on top of the "jelly roll" (where the "top" in this example is at the end where the negative electrode tab 642 extends from the "jelly roll" because the "jelly roll" is in an inverted position) and, after placing the insulative disc 693 on the "jelly roll," the negative electrode tab 642 extending from the "jelly roll" is extended alongside the insulative disc 693 so that it extends from an outer edge of the "jelly roll" to a center of the "jelly roll" that corresponds to a location where the negative terminal 604 will be. Thus, the insulative disc 693 is positioned between the "jelly roll" and the negative electrode tab 642. If the insulator 692 is in the form of a ring, then the insulator 692 may be placed on the other side of the negative electrode tab 642. The end of the negative electrode tab 642 that corresponds to the location where the negative terminal 604 will be may be inserted through a center hole in the insulator 692, with the end of the negative electrode tab 642 that is extending through the center of the insulator 642 then being folded to prepare it to contact the negative terminal 604 of the can 602. Alternatively, the insulator 692 may be a coating on the can so that it is not a component that is stacked on an end of the "jelly roll" as described above, but is instead a coating adhered to at least a portion of the internal bottom surface of the can, as described herein. After the "jelly roll" and the insulative disc 693 (and any separate, ring-shaped, insulator 692) are positioned, the can 602 (in an inverted position so that the negative terminal end is on the top side) may then be slid over the insulative disc 693 and the "jelly roll" (and, in some configurations, the insulator 692) so that they are placed within the can 602 with the negative electrode tab 642 in contact with the negative terminal 604, as shown in FIG. 6.

Thus, in embodiments, the negative electrode tab 642 is electrically connected to the negative terminal 604 while being electrically isolated from the can 602 (e.g. by the insulator 692) and the positive electrode (not shown) (e.g., by the insulating disc 693).

Figure 7:
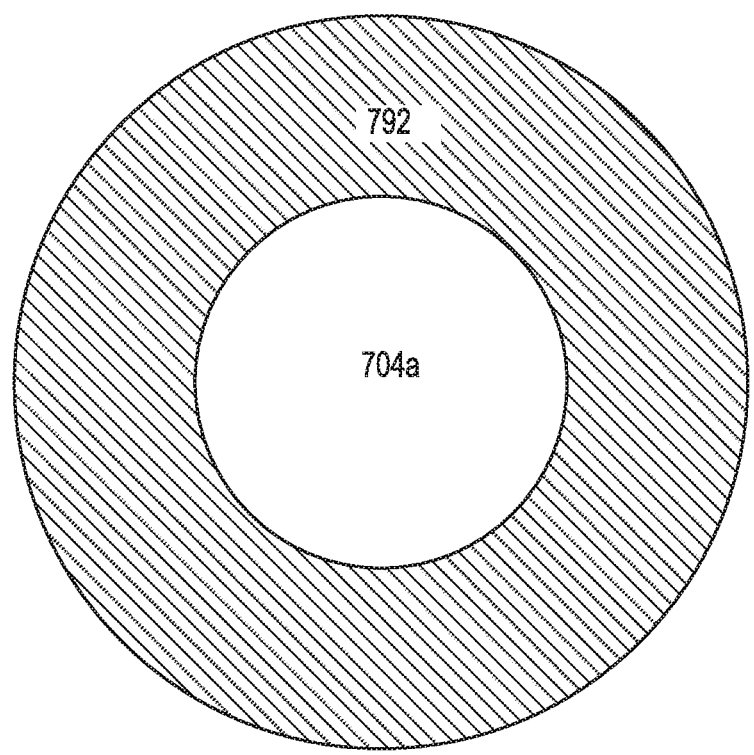
FIG. 7 shows a view of an insulator in accordance with embodiments of the present disclosure.

FIG. 7 shows a view of an insulator 792 in accordance with embodiments of the present disclosure. In certain aspects, the insulator 792 as shown in FIG. 7 may correspond to the insulator 692 as shown in FIG. 6. As shown in FIG. 7, the insulator 792 is an integral piece that may be positioned on top of the "jelly roll prior to inserting the insulator 792 and "jelly roll" into the can. The insulator 792 may have a shape that is similar to a donut, or ring, shape, which may be symmetrical (as shown) or asymmetrical. The shape of the insulator 792 may correspond to an interior cross-sectional area of the can (not shown), as discussed in FIG. 6.

The center of the insulator 792 has a hole 704a at a position that corresponds to a negative terminal (not shown) of the can. The hole 704a may have an area that encloses, or surrounds, a gasket at the negative terminal (not shown) so that the insulator 792 is adjacent to the gasket. Alternatively, the insulator 792 may extend to cover a portion or all of the gasket so that the insulator is in contact with the can and the gasket at an interior bottom surface of the can. The insulator 792 may have any thickness and may be about 0.1 mm to about 1 mm thick.

In various aspects, assembling the cell can require minimal changes to conventional manufacturing processes for lithium-ion cells. Main modifications/additions require the taping of the negative internal tab, installation of the gasket, and application of the electrically insulating material to the outer can surface. Given that the positive tab is currently taped, adding a similar process for the negative tab would be relatively simple to implement. All other processes can remain the same. The aluminum or aluminum alloy can with the nickel or nickel alloy negative terminal can replace the conventional Ni plated mild steel can.

For example, in the presently disclosed lithium-ion cells, during manufacturing, the electrochemical cell and its internal tabs must be isolated from the aluminum can. The "jelly roll" of electrodes has an outer wrap of separator and/or electrically insulative tape. A positive electrode of the cell is aluminum with an aluminum tab, and an aluminum foil current collector is ultrasonically welded to the aluminum tab. The aluminum tab is taped with an electrically insulative tape. The tab extends out and is laser welded to the aluminum weld plate that is in the header. The positive internal tab is also taped from the edge of the current collector to a within few millimeters from the end of the tab. Advantageously, the lithium-ion cells disclosed herein apply similar taping techniques to the positive and negative internal tabs and apply the tape from the edge of the current collector to within a few millimeters from the end of the tab. The negative electrode tab can be welded to the bottom terminal similar to conventional operating processes. For example, a copper resistance welding electrode can be inserted through the center of the jelly roll. The resistance welding electrode can press the negative electrode tab against the negative terminal in the bottom of the can and resistance weld them together. In the lithium-ion cells disclosed herein, the weld can be directly onto the negative terminal (e.g., a negative terminal disk). The taping of the negative internal tab would prevent the tab from contacting the positive electrode or the cell can.

The means by which the layers including a complete cell of some embodiments of the present disclosure are assembled into the final working cell are not critical. One skilled in the art will appreciate that a wide diversity of methods for assembling cells, including lithium-ion cells have been disclosed in the art. For the purposes of some embodiments of the present disclosure, any such methods which are compatible with the particular chemical and mechanical requisites of given embodiments of the present disclosure are suitable.

Embodiments include an electrochemical cell, comprising: a positive electrode comprising a positive electrode active material in electrically conductive contact with a positive electrode current collector; a negative electrode comprising a negative electrode active material in electrically conductive contact with a negative electrode current collector and a negative electrode tab including a first attachment end and a second attachment end, the first attachment end of the negative electrode tab being connected to the negative electrode current collector and the second attachment end of the negative electrode tab being connected to a negative terminal; an electrically insulative and ion conductive medium in ionically conductive contact with the positive electrode and the negative electrode, with the ionically conductive medium comprising an electrically insulating porous layer and an electrolyte; and an outer can containing the positive electrode, negative electrode and electrically insulative and ion conductive medium. An electrically insulative gasket electrically isolates the negative terminal from the outer can.

Embodiments include an electrochemical cell, comprising: a positive electrode comprising a positive electrode active material in electrically conductive contact with a positive electrode current collector; a negative electrode comprising a negative electrode active material in electrically conductive contact with a negative electrode current collector; an electrically insulative and ion conductive medium in ionically conductive contact with the positive electrode and the negative electrode, with the ionically conductive medium comprising an electrically insulating porous layer and an electrolyte; and a negative electrode tab including a first attachment end and a second attachment end. The first attachment end of the negative electrode tab is connected to the negative electrode current collector, the second attachment end of the negative electrode tab is connected to a negative terminal, and an electrically insulative tape is in contact with a portion of the negative electrode tab.

Embodiments include an electrochemical cell, comprising: a positive electrode comprising a positive electrode active material in electrically conductive contact with a positive electrode current collector; a negative electrode comprising a negative electrode active material in electrically conductive contact with a negative electrode current collector and a negative electrode tab including a first attachment end and a second attachment end, the first attachment end of the negative electrode tab being connected to the negative electrode current collector and the second attachment end of the negative electrode tab being connected to a negative terminal; an electrically insulative and ion conductive medium in ionically conductive contact with the positive electrode and the negative electrode, with the ionically conductive medium comprising an electrically insulating porous layer and an electrolyte; an outer can containing the positive electrode, negative electrode and electrically insulative and ion conductive medium; and an electrically insulating film in contact with an exterior surface of the outer can. The electrically insulating film can be in contact with a substantial portion of the surface area of the exterior surface.

Aspects of the above electrochemical cell include wherein the outer can comprises substantially a metal composition comprising one or more of aluminum or an alloy thereof and titanium or an alloy thereof and wherein the outer can is electrically isolated from each of the positive and negative electrodes and is substantially electrically neutral.

Aspects of the above electrochemical cell include wherein the outer can comprises substantially aluminum or an alloy thereof and wherein the gasket comprises one or more of glass, polymer, resin, and ceramics, and combinations thereof.

Aspects of the above electrochemical cell include wherein an electrically insulative tape is in contact with a portion of the negative electrode tab. The electrically insulative tape can extend from the connection to the negative electrode current collector along the portion of the negative electrode tab on a first side of the negative electrode tab. The electrically insulative tape can extend from the connection to the negative electrode current collector along a second portion of the negative electrode tab on a second side of the negative electrode tab. The electrically insulative tape can extend along each of the first side and the second side from the connection to the negative electrode current collector to within about 1-3 mm from the negative terminal.

Aspects of the above electrochemical cell further comprise an electrically insulating film in contact with an exterior surface of the outer can of the electrochemical cell. The electrically insulating film can be in contact with the gasket.

Aspects of the above electrochemical cell include wherein the electrically insulating film is in contact with the gasket.

Aspects of the above electrochemical cell include wherein the electrically insulative tape is positioned between the negative electrode tab and the positive electrode.

Aspects of the above electrochemical cell include wherein the electrically insulative tape is positioned between the negative electrode tab and the can.

Aspects of the above electrochemical cell include the electrically insulating film being in contact with more than 25% of the entire surface area of the exterior surface (or of the entire surface area of each end of the outer casing). The electrically insulating film can be in contact with more than 50% of the entire surface area of the exterior surface (or of the entire surface area of each end of the outer casing). The electrically insulating film can be in contact with more than 75% of the entire surface area of the exterior surface (or of the entire surface area of each end of the outer casing). The electrically insulating film can be in contact with more than 85% of the entire surface area of the exterior surface (or of the entire surface area of each end of the outer casing).

Embodiments include an electrochemical cell, comprising: a positive electrode comprising a positive electrode active material in electrically conductive contact with a positive electrode current collector; a negative electrode comprising a negative electrode active material in electrically conductive contact with a negative electrode current collector, and a negative electrode tab including a first attachment end and a second attachment end, the first attachment end of the negative electrode tab being connected to the negative electrode current collector and the second attachment end of the negative electrode tab being connected to a negative terminal; an electrically insulative and ion conductive medium in ionically conductive contact with the positive electrode and the negative electrode, wherein the ionically conductive medium comprises an electrically insulating porous layer and an electrolyte; and an outer can containing the positive electrode, the negative electrode and the electrically insulative and ion conductive medium, wherein an electrically insulative gasket electrically isolates the negative terminal from the outer can.

Aspects of the electrochemical cell include wherein the outer can comprises substantially a metal composition comprising one or more of aluminum or an alloy thereof and titanium or an alloy thereof. Aspects of the electrochemical cell include wherein the electrically insulative gasket is positioned around the negative terminal and comprises one or more of glass, polymer, resin, ceramics, and combinations thereof. Aspects of the electrochemical cell include wherein the outer can is electrically isolated from each of the positive and negative electrodes and is substantially electrically neutral. Aspects of the electrochemical cell include wherein an electrically insulative tape is adhered on both sides of an exposed portion of the negative electrode tab except at an attached portion of the second attachment end where the attached portion is connected to the negative terminal. Aspects of the electrochemical cell include wherein the electrically insulative tape is positioned between the negative electrode tab and the positive electrode and between the negative electrode tab and the outer can. Aspects of the electrochemical cell include wherein the attached portion is about 1 mm to about 5 mm of the negative electrode tab that is adjacent to the second attachment end. Aspects of the electrochemical cell include wherein an electrically insulating coating is in contact with an exposed portion of the negative electrode tab adjacent to the second attachment end. Aspects of the electrochemical cell include wherein an electrically insulative coating is in contact with an exposed portion of the negative electrode tab except at an attached portion of the second attachment end where the attached portion is connected to the negative terminal. Aspects of the electrochemical cell include wherein the attached portion is about 1 mm to about 5 mm of the negative electrode tab that is adjacent to the second attachment end. Aspects of the electrochemical cell include wherein the electrically insulative coating is between the negative electrode tab and the positive electrode and between the negative electrode tab and the outer can. Embodiments include an electrochemical cell, comprising: a positive electrode comprising a positive electrode active material in electrically conductive contact with a positive electrode current collector; a negative electrode comprising a negative electrode active material in electrically conductive contact with a negative electrode current collector; an electrically insulative and ion conductive medium in ionically conductive contact with the positive electrode and the negative electrode, wherein the ionically conductive medium comprises an electrically insulating porous layer and an electrolyte; and a negative electrode tab including a first attachment end and a second attachment end, wherein the first attachment end of the negative electrode tab is connected to the negative electrode current collector, wherein the second attachment end of the negative electrode tab is connected to a negative terminal, and wherein an electrically insulative material is in contact with a portion of the negative electrode tab adjacent to the negative terminal.

Aspects of the electrochemical cell include wherein the outer can is electrically isolated from each of the positive and negative electrodes and is substantially electrically neutral. Aspects of the electrochemical cell further comprise an electrically insulative gasket positioned between the negative terminal and the outer can. Aspects of the electrochemical cell include wherein the electrically insulative material is an electrically insulative tape adhered on an exposed portion of the negative electrode tab. Aspects of the electrochemical cell include wherein the exposed portion is between the negative electrode tab and the positive electrode and between the negative electrode tab and the outer can. Aspects of the electrochemical cell include wherein the electrically insulative material is an epoxy coating. Aspects of the electrochemical cell include wherein the epoxy coating is in contact with an entirety of an exposed portion of the negative electrode tab except at an attached portion of the second attachment end where the attached portion is connected to the negative terminal. Aspects of the electrochemical cell further comprise an electrically insulating film covering at least a portion of the outer can and adjacent to the electrically insulative gasket.

Embodiments include an electrochemical cell, comprising: a positive electrode comprising a positive electrode active material in electrically conductive contact with a positive electrode current collector; a negative electrode comprising a negative electrode active material in electrically conductive contact with a negative electrode current collector and a negative electrode tab including a first attachment end and a second attachment end, the first attachment end of the negative electrode tab being connected to the negative electrode current collector and the second attachment end of the negative electrode tab being connected to a negative terminal; an electronically insulative and ion conductive medium in ionically conductive contact with the positive electrode and the negative electrode, wherein the ionically conductive medium comprises an electrically insulating porous layer and an electrolyte; an outer can containing the positive electrode, negative electrode and electronically insulative and ion conductive medium; and an electrically insulating film in contact with an exterior surface of the outer can, wherein the electrically insulating film is positioned between the outer can and the negative terminal.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by the use of such language as "for example," "such as," "by way of example," "e.g.," and other language commonly understood to indicate that what follows is an example.

The systems and methods of this disclosure have been described in relation to the creation and manufacture of a lithium-ion cell. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the disclosure.

The present disclosure is not limited in its application to the details of construction and the arrangement of components set forth in the description herein or illustrated in the drawings. The disclosure is capable of other embodiments and of being practiced or of being carried out in various ways. Also, it is to be understood that the phraseology and terminology used herein is for the purpose of description and should not be regarded as limiting. The present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. An electrochemical cell, comprising:
   a positive electrode comprising a positive electrode active material in electrically conductive contact with a positive electrode current collector, the positive electrode current collector being electrically connected to a positive terminal;
   a negative electrode comprising a negative electrode active material in electrically conductive contact with a negative electrode current collector, and a negative electrode tab including a first attachment end and a second attachment end, the first attachment end of the negative electrode tab being connected to the negative electrode current collector and the second attachment end of the negative electrode tab being connected to a negative terminal;
   an electrically insulative and ion conductive medium in ionically conductive contact with the positive electrode and the negative electrode, wherein the electrically insulative and ion conductive medium comprises an electrically insulating porous layer and an electrolyte; and
   an outer can containing the positive electrode, the negative electrode, and the electrically insulative and ion conductive medium, wherein an electrically insulative gasket electrically isolates the negative terminal from the outer can, wherein the outer can is electrically isolated from the positive terminal,
   wherein the electrically insulative gasket is in contact with a bottom end of the outer can and the positive electrode current collector is at a top end of the outer can,
   wherein the negative terminal is exposed at the bottom end of the outer can, and
   wherein the positive terminal is exposed at the top end of the outer can; and
   a first insulative structure having a shape that corresponds to a shape of the outer can and located within the outer can at the bottom end of the outer can; and
   a second insulative structure having a shape that corresponds to the shape of the outer can and located within the outer can at the bottom end of the outer can such that at least part of the negative electrode tab is sandwiched between the first insulative structure and the second insulative structure.

2. The electrochemical cell of claim 1, wherein the outer can comprises substantially a metal composition comprising one or more of aluminum or an alloy thereof or titanium or an alloy thereof.

3. The electrochemical cell of claim 1, wherein the electrically insulative gasket is positioned around the negative terminal and comprises one or more of glass, polymer, resin, ceramics, or combinations thereof.

4. The electrochemical cell of claim 1, wherein the negative terminal is in direct contact with the electrically insulative gasket.

5. The electrochemical cell of claim 1, wherein an electrically insulative tape is adhered on both sides of an exposed portion of the negative electrode tab except at an attached portion of the second attachment end where the attached portion is connected to the negative terminal, and wherein the electrically insulative tape is positioned between the negative electrode tab and the positive electrode and between the negative electrode tab and the outer can.

6. The electrochemical cell of claim 1, wherein an electrically insulative tape is adhered on both sides of an exposed portion of the negative electrode tab except at an attached portion of the second attachment end where the attached portion is connected to the negative terminal, and wherein the attached portion is about 1 mm to about 5 mm of the negative electrode tab that is adjacent to the second attachment end.

7. The electrochemical cell of claim 1, wherein an electrically insulating coating is in contact with an exposed portion of the negative electrode tab adjacent to the second attachment end.

8. The electrochemical cell of claim 1, wherein the outer can is integrally shaped with a side surface that curves into the bottom end, and wherein the electrically insulative gasket is positioned within the outer can at the bottom end.

9. The electrochemical cell of claim 8, wherein an electrically insulative coating is in contact with an exposed portion of the negative electrode tab except at an attached portion of the second attachment end where the attached portion is connected to the negative terminal, and wherein the attached portion is about 1 mm to about 5 mm of the negative electrode tab that is adjacent to the second attachment end.

10. The electrochemical cell of claim 8, wherein an electrically insulative coating is in contact with an exposed portion of the negative electrode tab except at an attached portion of the second attachment end where the attached portion is connected to the negative terminal, and wherein the electrically insulative coating is between the negative electrode tab and the positive electrode and between the negative electrode tab and the outer can.

11. An electrochemical cell, comprising:
    a positive electrode comprising a positive electrode active material in electrically conductive contact with a positive electrode current collector, the positive electrode current collector being electrically connected to a positive terminal;
    a negative electrode comprising a negative electrode active material in electrically conductive contact with a negative electrode current collector;
    an electrically insulative and ion conductive medium in ionically conductive contact with the positive electrode and the negative electrode, wherein the electrically insulative and ion conductive medium comprises an electrically insulating porous layer and an electrolyte;
    an outer can containing the positive electrode, the negative electrode, and the electrically insulative and ion conductive medium; and
    a negative electrode tab including a first attachment end and a second attachment end,
    wherein the first attachment end of the negative electrode tab is connected to the negative electrode current collector,
    wherein the second attachment end of the negative electrode tab is connected to a negative terminal,
    wherein an electrically insulative material is in contact with a portion of the negative electrode tab adjacent to the negative terminal, wherein the negative electrode tab is at a bottom end of the outer can, wherein the negative terminal is physically separate from and exposed at the bottom end of the outer can, and wherein the positive terminal is physically separate from and exposed at a top end of the outer can; and a first insulative structure having a shape that corresponds to a shape of the outer can and located within the outer can at the bottom end of the outer can; and a second insulative structure having a shape that corresponds to the shape of the outer can and located within the outer can at the bottom end of the outer can such that at least part of the negative electrode tab is sandwiched between the first insulative structure and the second insulative structure.

12. The electrochemical cell of claim 11, wherein the outer can is electrically isolated from each of the positive and negative terminals and is substantially electrically neutral.

13. The electrochemical cell of claim 12, further comprising an electrically insulative gasket positioned between the negative terminal and the outer can.

14. The electrochemical cell of claim 13, further comprising an electrically insulating film covering at least a portion of the outer can and adjacent to the electrically insulative gasket.

15. The electrochemical cell of claim 11, wherein the electrically insulative material is an electrically insulative tape adhered on an exposed portion of the negative electrode tab.

16. The electrochemical cell of claim 15, wherein the exposed portion is between the negative electrode tab and the positive electrode and between the negative electrode tab and the outer can.

17. The electrochemical cell of claim 11, wherein an outer surface of the negative terminal is flush with an outer surface of the outer can at the bottom end of the outer can.

18. The electrochemical cell of claim 11, wherein the electrically insulative material is an epoxy coating, and wherein the epoxy coating is in contact with an entirety of an exposed portion of the negative electrode tab except at an attached portion of the second attachment end where the attached portion is connected to the negative terminal.

19. An electrochemical cell, comprising:

a positive electrode comprising a positive electrode active material in electrically conductive contact with a positive electrode current collector;

a negative electrode comprising a negative electrode active material in electrically conductive contact with a negative electrode current collector and a negative electrode tab including a first attachment end and a second attachment end, the first attachment end of the negative electrode tab being connected to the negative electrode current collector and the second attachment end of the negative electrode tab being connected to a negative terminal;

an electronically insulative and ion conductive medium in ionically conductive contact with the positive electrode and the negative electrode, wherein the electrically insulative and ion conductive medium comprises an electrically insulating porous layer and an electrolyte;

an outer can containing the positive electrode, negative electrode, and the electronically insulative and ion conductive medium; and an electrically insulating film in contact with an exterior surface of the outer can, wherein a surface of the negative terminal is exposed at an end of the outer can, wherein the negative terminal is electrically isolated from the outer can, and wherein the surface of the negative terminal is flush with a surface of the end of the outer can; and a first insulative structure having a shape that corresponds to a shape of the outer can and located within the outer can at the bottom end of the outer can; and a second insulative structure having a shape that corresponds to the shape of the outer can and located within the outer can at the bottom end of the outer can such that at least part of the negative electrode tab is sandwiched between the first insulative structure and the second insulative structure.

\* \* \* \* \*